US009238209B2

(12) United States Patent
Couch et al.

(10) Patent No.: US 9,238,209 B2
(45) Date of Patent: Jan. 19, 2016

(54) ADVANCED ELEVATED FEED DISTRIBUTION APPARATUS AND PROCESS FOR LARGE DIAMETER FCC REACTOR RISERS

(75) Inventors: Keith A. Couch, Arlington Heights, IL (US); Robert L. Mehlberg, Wheaton, IL (US); Mohammad-Reza Mostofi-Ashtiani, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 761 days.

(21) Appl. No.: 13/029,274

(22) Filed: Feb. 17, 2011

(65) Prior Publication Data

US 2011/0198267 A1 Aug. 18, 2011

Related U.S. Application Data

(60) Provisional application No. 61/305,766, filed on Feb. 18, 2010.

(51) Int. Cl.
  *C10G 11/18* (2006.01)
  *B01J 8/18* (2006.01)
(52) U.S. Cl.
  CPC .............. *B01J 8/1827* (2013.01); *C10G 11/18* (2013.01)
(58) Field of Classification Search
  USPC .................... 208/113; 585/920–925; 422/129
  See application file for complete search history.

(56) References Cited

U.S. PATENT DOCUMENTS

| | | | |
|---|---|---|---|
| 2,606,097 A | 8/1952 | Goodson et al. | |
| 2,668,755 A | 2/1954 | Kershaw et al. | |
| 3,894,932 A | 7/1975 | Owen | |
| 4,427,537 A | 1/1984 | Dean et al. | |
| 5,098,554 A | 3/1992 | Krishna et al. | |
| 5,139,748 A | 8/1992 | Lomas et al. | |
| 5,306,418 A | 4/1994 | Dou et al. | |
| 5,318,691 A | 6/1994 | Muldowney | |
| 5,554,341 A | 9/1996 | Wells et al. | |
| 5,562,818 A | 10/1996 | Hedrick | |
| 5,846,403 A | 12/1998 | Swan et al. | |
| 6,042,717 A | 3/2000 | Radcliffe et al. | |
| 6,146,519 A | 11/2000 | Koves | |
| 6,491,875 B1 | 12/2002 | Palmas | |
| 6,596,242 B1 | 7/2003 | Dries | |
| 6,616,900 B1 | 9/2003 | Lomas | |
| 7,087,154 B2 | 8/2006 | Pinho et al. | |
| 7,101,474 B2 | 9/2006 | Sattar | |
| 7,332,131 B2 | 2/2008 | Chen et al. | |
| 7,670,478 B2 | 3/2010 | Swan, III et al. | |
| 2006/0144758 A1 | 7/2006 | Swan et al. | |
| 2007/0261992 A1* | 11/2007 | Roux et al. | 208/113 |
| 2008/0035526 A1 | 2/2008 | Hedrick et al. | |
| 2008/0081006 A1* | 4/2008 | Myers et al. | 422/145 |

* cited by examiner

*Primary Examiner* — Michelle Stein
(74) *Attorney, Agent, or Firm* — James C. Paschall

(57) ABSTRACT

An FCC process and apparatus may include injecting hydrocarbon feedstock at different radial positions while at the same elevation inside a riser. Multiple distributors may be used to position the tips for injecting feedstock at multiple radial positions. The distributors with tips more deeply positioned in the riser will penetrate a dense catalyst column we discovered generates in risers of larger diameter over 1.3 meters.

18 Claims, 11 Drawing Sheets
(4 of 11 Drawing Sheet(s) Filed in Color)

ADVANCED ELEVATED FEED DISTRIBUTION APPARATUS AND PROCESS FOR LARGE DIAMETER FCC REACTOR RISERS

CROSS-REFERENCE TO RELATED APPLICATION

This application claims priority from Provisional Application No. 61/305,766 filed Feb. 18, 2010, the contents of which are hereby incorporated by reference.

BACKGROUND OF THE INVENTION

This invention relates generally to a process for catalytic cracking of hydrocarbons.

DESCRIPTION OF THE PRIOR ART

Fluid catalytic cracking (FCC) is a catalytic conversion process for cracking heavy hydrocarbons into lighter hydrocarbons by bringing the heavy hydrocarbons into contact with a catalyst composed of finely divided particulate material in a fluidized reaction zone. Most FCC units use zeolite-containing catalyst having high activity and selectivity. As the cracking reaction proceeds, substantial amounts of highly carbonaceous material, referred to as coke, are deposited on the catalyst, forming spent catalyst. High temperature regeneration burns the coke from the spent catalyst. The regenerated catalyst may be cooled before being returned to the reaction zone. Spent catalyst is continually removed from the reaction zone and replaced by essentially coke-free catalyst from the regeneration zone.

The basic components of the FCC process include a riser, a reactor vessel, a catalyst stripper, and a regenerator. In the riser, a feed distributor injects the hydrocarbon feed which contacts the catalyst and is cracked into a product stream containing lighter hydrocarbons. An inert lift gas such as steam may be used to accelerate catalyst in a lower section of the riser below or during introduction of the feed. The lift velocity refers to the velocity of the inert gas and the lifted catalyst just before feed distribution into the lift gas. Catalyst and hydrocarbon feed are transported upwardly in the riser by the expansion of the gases that result from the vaporization of the hydrocarbons and other lift and dispersion media as well as molar expansion of cracked products upon contact with the hot catalyst. Coke accumulates on the catalyst particles as a result of the cracking reaction, and the catalyst is then referred to as "spent catalyst." The reactor vessel disengages spent catalyst from product vapors. The catalyst stripper removes adsorbed hydrocarbons from the surface of the catalyst. The regenerator burns the coke from the catalyst and recycles the regenerated catalyst into the riser.

New FCC unit designs are becoming progressively larger. The part of the riser into which feed is injected has recently expanded from a typical 0.6 to 1.3 m (2 to 4 ft) inner diameter up to a range of 1.6 to 3 m (5 to 9 ft) inner diameter for commercialized units, and new units may be even larger.

A problem encountered during the FCC process is distributing the feed in the riser so that it can adequately mix with the catalyst. Adequate mixing is usually necessary for efficient conversion of the feed. Hydrocarbon feed distributors spray dispersion steam and hydrocarbon feed into the riser at a tip exit velocity with a horizontal component across the riser. However, a relationship between injected feed velocity, drop size and momentum limits the horizontal travel of the injected hydrocarbon feed against the lift gas and catalyst accelerating vertically, upwardly in the riser. Larger riser diameters may exacerbate this problem because of the difficulty in distributing the feedstock to the center of the riser.

SUMMARY OF THE INVENTION

We have found that for FCC risers with larger diameters, the combined oil feed and dispersion media from the feed distributors only penetrates the riser approximately 0.6 m (2 ft) in the horizontal plane. As the oil vaporizes and cracks to form lighter products, the overall volume expansion causes a vapor annulus that travels vertically up the riser. The momentum of the liquid to vapor expansion causes the catalyst nearer the center of the riser to be pushed into a higher density stable column. The result is three distinct reaction zones. A lower velocity higher density region near the riser wall in zone 1. A more dilute annulus in zone 2. A higher density steam and catalyst center column with a low concentration of hydrocarbon feed in zone 3. As a result of zone 1, the average residence time of a portion of the hydrocarbon in the riser is longer, resulting in more coke deposition on the catalyst. As a result of zone 2, the catalyst-oil contacting in the riser is poorer, resulting in lower conversion. As a result of zone 3, hot catalyst is concentrated in the center of the riser, resulting in hotter catalyst-oil contacting temperature further up the riser and additional dry gas formation.

Now that these dynamics are understood, the present invention involves a fluid catalytic cracking apparatus comprising a riser having a wall and an inner diameter defined by the wall of at least 1.3 m and at least two feed distributors. The two feed distributors each have a respective tip, and one or more openings in the respective tip. The two distributors each have the respective tip positioned at the same elevation within a margin of 0.25 inner diameters of the riser at the elevation of the feed distributors but positioned at different radial distances from the wall in the riser.

The present invention may also involve a fluid catalytic cracking process comprising passing catalyst and inert gas upwardly in a riser having a wall and an inner diameter defined by the wall of at least 1.3 m. A hydrocarbon feedstock is injected into the riser from at least two distributors having respective tips with at least one opening in each of the tips. The respective tips of the at least two distributors are positioned at the same elevation within a margin of 0.25 inner diameters of the riser at the elevation of the feed distributors but are positioned at different radial distances from the wall in the riser. The hydrocarbon feedstock is cracked in the presence of the catalyst to produce a cracked stream and the catalyst is separated from the cracked stream.

The present invention may further involve a fluid catalytic cracking process comprising passing catalyst and inert gas upwardly at a rate of less than 4.7 m (14 ft) per second in a riser having a wall and an inner diameter defined by the wall of between 1.3 and 2.2 m. A hydrocarbon feedstock is injected into the riser from at least two distributors having tips and at least one opening in each of the tips. The tips are positioned at the same elevation within a margin of 0.25 inner diameters of the riser at the elevation of the feed distributors but positioned at different radial distances from the wall in the riser. The hydrocarbon feedstock is cracked in the presence of the catalyst to produce a cracked stream which is separated from the catalyst. In an aspect, the catalyst and inert gas pass upwardly at a rate of no more than 3.3 m/s. In a further aspect, the riser has an inner diameter of less than or equal to 1.6 m.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present invention addresses our discovery that large risers with inner diameters of at least 1.3 m (4 ft) suffer from poor catalyst hydrodynamics and catalyst-feed contacting in the riser. Compared to benchmark performance of a modern FCC unit the larger units exhibited lower conversion and higher dry gas production.

We conducted Computational Fluid Dynamic (CFD) modeling and contracted radioactive tracer and tomography testing on an FCC unit with a riser inner diameter of 2 m (6.6 ft) at the point of feed injection. The cumulative results of the testing showed that the combined oil feed and dispersion steam from the feed distributors only penetrated the riser approximately 0.6 m (2 ft) in the horizontal plane. Hence, if a riser has an inner diameter of greater than 1.3 m (4 ft), even contacting of feed and catalyst cannot occur.

This invention relates generally to an improved FCC process and apparatus. Specifically, this invention may relate to an improved feed distributor arrangement and may be useful for FCC operation to improve feedstock conversion through greater feed dispersal, especially in larger FCC units such as with inner diameters greater than 1.3 m (4 ft). The process and apparatus aspects of this invention may be used in the design of new FCC units or to modify the operation of existing FCC units.

Figure 1:
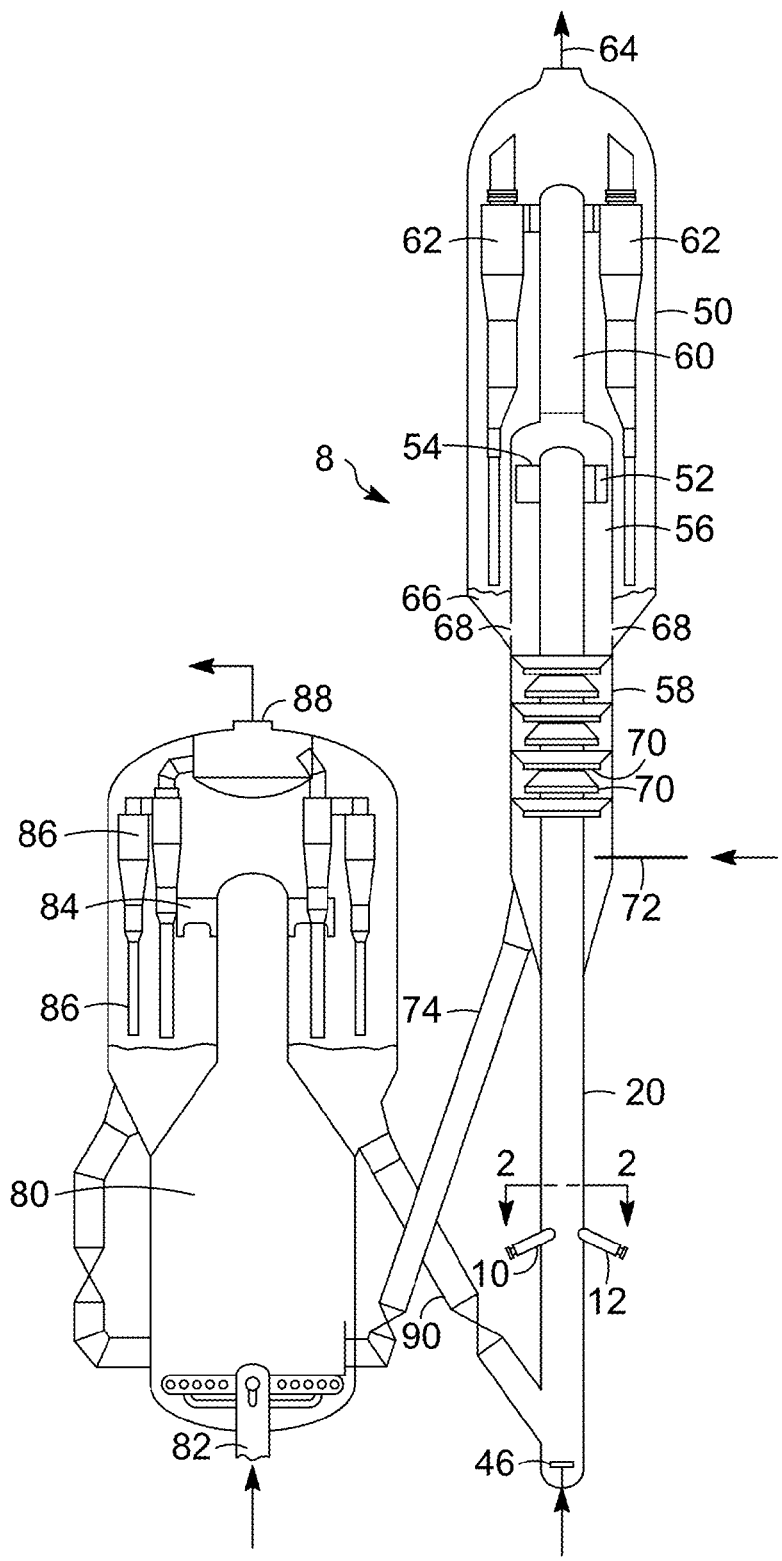
FIG. 1 is an elevational schematic showing an FCC unit.

As shown in FIG. 1, an FCC unit 8 may be used in the FCC process. Feedstock may be injected by distributors 10, 12 into the riser 20 where it contacts lift gas and catalyst. The lift gas may include inert gas such as steam distributed by lift gas distributor 46. In general, feedstock may be cracked in the riser 20 in the presence of catalyst to form a cracked stream. Distributors 10, 12 may be located at different radial positions to improve feedstock distribution in the riser 20 and mixing with catalyst.

Figure 2:
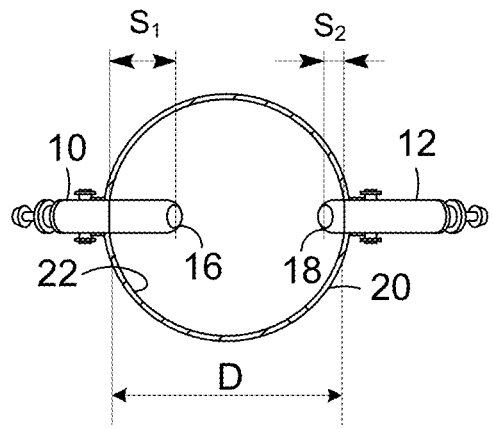
FIG. 2 is a cross sectional view taken along segment 2-2 in FIG. 1.

Shown in FIG. 2 is one embodiment of an arrangement of feed distributors 10, 12 illustrating the different radial positions for injecting feedstock into the riser 20. Distributor 10 has a tip 16 that penetrates from an inner wall 22 of the riser 20 by a radial distance to a center of the tip 16 of $S_1$, and distributor 12 has a tip 18 that penetrates from the inner wall 22 by a different radial distance to a center of the tip 18 of $S_2$. $S_1$ is greater than $S_2$. The difference in penetration between $S_1$ and $S_2$ may be equal to between about 15% and 40% of an inner diameter D of the riser at the elevation of the feed distributors 10, 12. Referring to FIG. 2, the space $S_1$ between the tip 16 and the closest portion of the wall 22 may be a distance equal to between about 5% and about 45% of an inner diameter D of the riser 20, preferably between about 15% and about 35%. The inner diameter D is at least 1.3 m (4 ft). The tip 16, 18 of each distributor 10, 12, respectively, penetrates into the riser at different radial distances.

Figure 3:
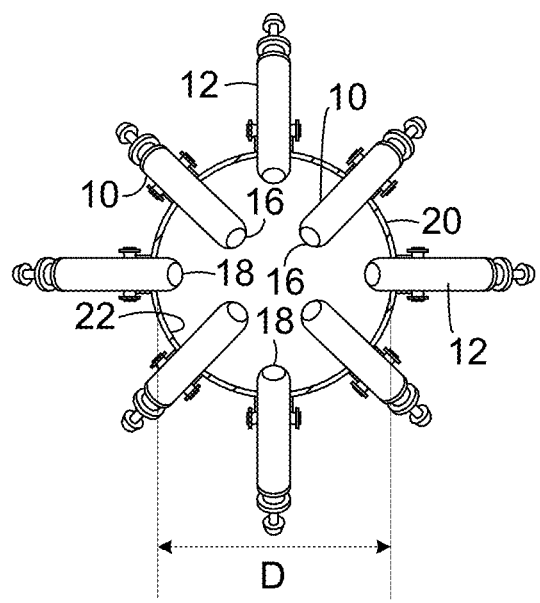
FIG. 3 is an alternative cross sectional view taken along segment 2-2 in FIG. 1 showing an embodiment with different radial positions between two sets of distributors.

At least two feed distributors 10, 12 may inject hydrocarbon feed into the riser. Multiple distributors 10, 12, as shown in FIG. 3, may be arranged in a plurality of the two feed distributors 10, 12. An inner set of distributors 10 and an outer set of distributors 12 may be arranged in rings around the riser 20 at different radial extensions, and circumferentially spaced generally evenly. Each of the sets of feed distributors 10 and 12 may penetrate the wall 22 at different elevations. To allow the feed distributors to achieve a deeper penetration into the dense column of catalyst, half of the feed distributors, that is feed distributors 10 in the inner set, have tips 16 positioned radially deeper into the riser than tips 18 of feed distributors 12 in the outer set to target the inner 50% of the cross sectional area of the riser 20.

The tips 16, 18 may be positioned at the same elevations and in such a way as to avoid adjacent spray impact that could cause undesirable spray interference and prevent catalyst bouncing away from injected feed from one distributor to avoid feed injected from another distributor and to ensure the most uniform and rapid catalyst-oil contacting as possible. The faster the catalyst and oil are contacted in the riser, the more controllable the overall reaction will be. Installing all of the feed distributor tips 16, 18 on the same horizontal elevation plane also prevents excessive erosion of adjacent feed distributors as a result of the high kinetic energy produced from flashing feed in a fluidized solids environment Distributors 10, 12 may have differing or the same capacities and may distribute different flow rates of feedstock to different areas within the riser to optimize coverage across the riser 20. Distributors typically inject hydrocarbon feed and inert dispersion gas, such as steam, at a rate of 52-76 m/s (170-250 ft/s). The differing flow rates may range from about 30 to 200 wt-% of the average distributor capacity, preferable about 60 to about 150 wt-%. The feed distribution set on two radii enables control of oil and steam distribution to enable up to 92 wt-% of the oil to be fed from the feed distributors 12 on the outer radius in the outer set with a turndown to about 30 wt-% of the total oil feed. The distributors 10 on the inner radius in the inner set can accommodate a range of 8 wt-% of the oil up to about 70 wt-% of the oil. A ratio of feed injected from outer set of distributors 12 to feed injected from inner set of distributors 10 of 67:33 was optimal. An inner biased ratio of 50:50 was asymmetric and had disparate catalyst densities across the cross section of the riser. An outer based ratio of 92:8 revealed formation a column of dense catalyst. Having this wide range of control will enable optimization of the overall catalyst and oil contacting for the best product selectivity performance under varying circumstances.

Figure 4:
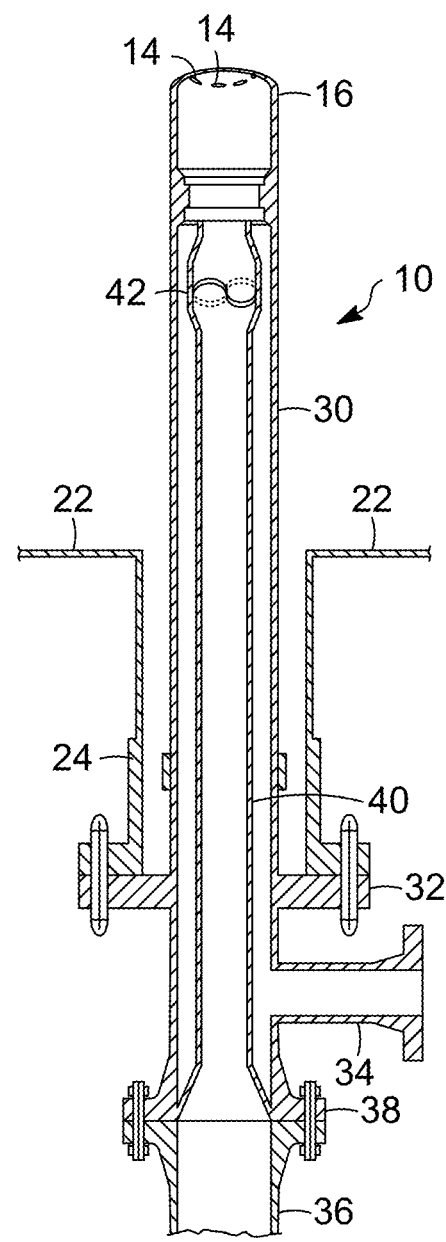
FIG. 4 is a cross-sectional view of a feed distributor.

FIG. 4 shows a detail of the distributor 10. In one embodiment, feedstock is injected through one or more orifices, or openings, 14 usually near or on the tip 16. Preferably, a plurality of openings 14 are on the end of the tip 16, arranged in a circular or oval pattern. In addition, multiple circular or oval patterns of openings 14 may be used on one tip 16.

In one embodiment, a riser may have a nozzle 24 which engages a distributor barrel 30 by a barrel body flange 32. The distributor barrel 30 receives inert dispersion media such as steam from a dispersion media inlet pipe 34 and oil through an oil inlet pipe 36, secured to the oil inlet flange 38 by bolts. Oil may pass through the internal oil pipe 40 and over vanes 42, causing the oil to swirl before combining with the dispersion media and exiting through the opening 14 in the tip 16.

Figure 5:
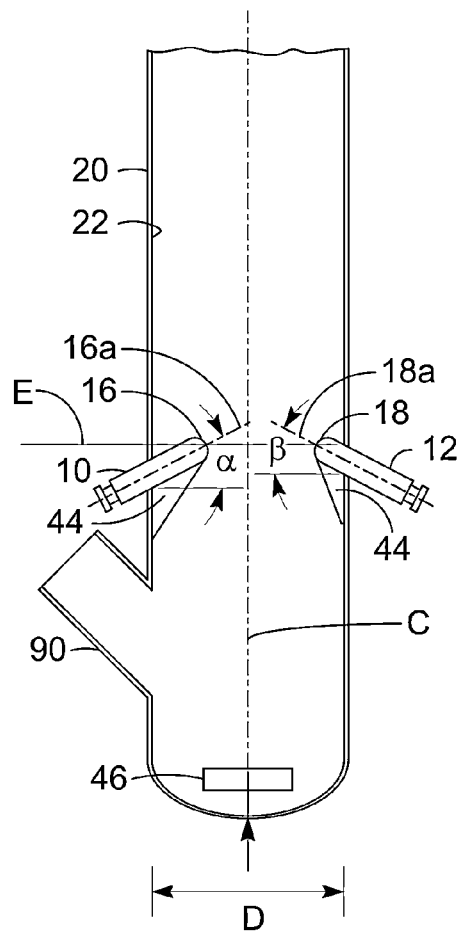
FIG. 5 is a partial sectional view of a riser.

As shown in FIG. 5, distributors 10 and 12 may be penetrate the wall 22 of the riser 20 at different elevations but with respective tips 16 and 18 positioned at the same vertical elevation. The same elevation of the feed distributor tips 16, 18 includes a margin of 0.25 and preferably 0.1 inner diameters D of the riser 20 at the elevation of the feed distributors 10, 12, up or down between distributor tips 16, 18. Distributor tips 16, 18 within this margin can still derive the advantages of the arrangement. The point of reference for tips 16, 18 for determining the same elevation and the radial position is the center of the tip. The center of the tip is the point at which a centerline 16a, 18a extending axially through the respective tip 16, 18 intersects the outer surface of the tip. A respective centerline 16a, 18a of each tip 16, 18 intersects an outer surface of the respective tip at the same elevation with a margin of 0.25 and preferably 0.1 inner diameters D at the elevation of the feed distributors 10, 12. Typically, this centerline 16a, 18a through the tip 16, 18 will be collinear with an axial line through the distributor 10, 12, respectively. Segment "E" demonstrates the same elevation of distributor tips 16 and 18 in FIG. 5.

Distributors 10, 12, as shown in FIG. 5, may be oriented at angles α or β upwardly from horizontal. Distributors 10, 12 may have a pattern of openings on respective tips 16, 18 that inject feedstock in a spray pattern that defines respective centerlines 16a, 18a. Alternatively or additionally to the orientation of the distributors, the centerlines 16a, 18a of spray patterns may be oriented at angles α or β upwardly from horizontal. Preferably, these angles α and β are each between about 15 and about 60 degrees upward from horizon, and more preferably between about 20 and about 40 degrees. Lift gas may be introduced into riser 20, preferably near the bottom, through the distributor 46. The lift gas may be inert to the FCC reaction and preferably comprises steam.

Figure 6:
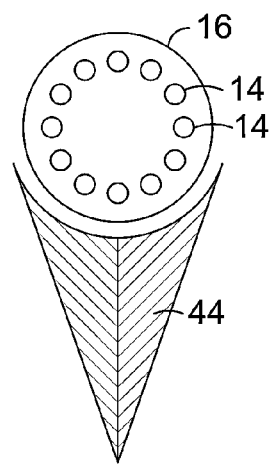
FIG. 6 is an elevational diagram showing a distributor tip and a shaping vane.

The tip 16 of feed distributor 10 may be inserted far enough into the riser to ensure that injected feed oil and dispersion steam reach the axial centerline C of the riser 20. In an alternative embodiment, centerlines 16a and 18a may intersect centerline C at the same elevation (not shown). In an embodiment, at least the feed distributors 10 which are more exposed to the stream of upwardly accelerating catalyst can be made of or be covered with a ceramic coating to prevent erosion. As shown in FIG. 5, and in detail in FIG. 6, a shaping vane 44 may be used to direct the flow of materials around the portion of the distributor 12 extending into the inside the riser 20. Shaping vane 44 may be attached to the distributor 12 and to the wall 22 or only to the distributor 12 or wall 22. A refractory coating may cover the surface of the shaping vane 44 or distributor 12, or both, to protect against erosion. A refractory coating is typically provided on the inner wall 22 of the riser 20.

As shown in FIG. 1, the injected feed mixes with a fluidized bed of catalyst and moves up the riser 20 and enters the reactor 50. In the reactor 50, the blended catalyst and reacted feed vapors are then discharged from the top of the riser 20 through the riser outlet 52 and separated into a cracked product vapor stream and a collection of catalyst particles covered with substantial quantities of coke and generally referred to as "coked catalyst." A swirl arm arrangement 54, provided at the end of the riser 20, may further enhance initial catalyst and cracked hydrocarbon separation by imparting a tangential velocity to the exiting catalyst and cracked product vapor stream mixture. The swirl arm arrangement 54 is located in an upper portion of a separation chamber 56, and a stripping zone 58 is situated in the lower portion of the separation chamber 56. Catalyst separated by the swirl arm arrangement 54 drops down into the stripping zone 58.

The cracked product vapor stream comprising cracked hydrocarbons including gasoline and some catalyst may exit the separation chamber 56 via a gas conduit 60 in communication with cyclones 62. The cyclones 62 may remove remaining catalyst particles from the product vapor stream to reduce particle concentrations to very low levels. The product vapor stream may exit the top of the reactor 50 through a product outlet 64. Catalyst separated by the cyclones 62 returns to the reactor 50 through diplegs into a dense bed 66 where catalyst will pass through chamber openings 68 and enter the stripping zone 58. The stripping zone 58 removes adsorbed and entrained hydrocarbons from the catalyst by counter-current contact with steam over the optional baffles 70. Steam may enter the stripping zone 58 through a line 72. A coked catalyst conduit 74 transfers coked catalyst to a regenerator 80.

As shown in FIG. 1, the regenerator 80 receives the coked catalyst and typically combusts the coke from the surface of the catalyst particles by contact with an oxygen-containing gas. The oxygen-containing gas enters the bottom of the regenerator 80 via a regenerator distributor 82. Flue gas passes upwardly through the regenerator 80. A primary separator, such as a tee disengager 84, initially separates catalyst from flue gas. Regenerator cyclones 86, or other means, remove entrained catalyst particles from the rising flue gas before the flue gas exits the vessel through an outlet 88. Combustion of coke from the catalyst particles raises the temperatures of the catalyst. The catalyst may pass, regulated by a control valve, through a regenerator standpipe 90 which communicates with the bottom portion of riser 20.

In the FCC process a lift gas such as steam may be passed into the riser 20 to contact and lift the catalyst in the in the riser 20 to the feed point. Regenerated catalyst from the regenerator standpipe 90 will usually have a temperature in a range from about 649° and about 760° C. (1200° to 1400° F.). The dry air rate to the regenerator may be between about 3.6 and about 6.3 kg/kg coke (8 and 14 lbs/lb coke). The hydrogen in coke may be between about 4 and about 8 wt-%, and the sulfur in coke may be between about 0.6 and about 3.0 wt-%. Catalyst coolers on the regenerator may be used. Additionally, the regenerator may be operated under partial CO combustion conditions. Moreover, water or light cycle oil may be added to the bottom of the riser to maintain the appropriate temperature range in FCC unit. Conversion is defined by conversion to gasoline and lighter products with 90 vol-% of the gasoline product boiling at or below 193° C. (380° F.) using ASTM D-86. The conversion may be between about 55 and about 90 vol-% as produced.

The zeolitic molecular sieves used in typical FCC gasoline mode operation have a large average pore size and are suitable for the present invention. Molecular sieves with a large pore size have pores with openings of greater than 0.7 nm in effective diameter defined by greater than 10 and typically 12 membered rings. Suitable large pore molecular sieves include synthetic zeolites such as X-type and Y-type zeolites, mordenite and faujasite. Y-type zeolites with low rare earth content are preferred. Low rare earth content denotes less than or equal to about 1.0 wt-% rare earth oxide on the zeolitic portion of the catalyst. Catalyst additives may be added to the catalyst composition during operation.

In one embodiment, the fluidized catalyst is accelerated by lift gas from distributor 46 in a lower end of the riser 20 to reach the distributors 10, 12. We have found that the dense phase catalyst column can form in risers with an inner diameter of less than 2.2 m (6.6 ft) or 2 m (5.75 ft) and particularly at less than or equal to 1.7 m (5 ft) but greater than 1.3 m (4 ft) when the lift velocity is less than 4.7 msec (14 ft/sec) or 4 msec (12 ft/sec) and particularly no greater than 3.3 msec (10 ft/sec) at the point of feed injection, so the present invention is especially advantageous under these conditions. At an inner diameter of at least 2.2 m (6.6 ft), we have found that the dense phase column always forms regardless of the velocity of the lift gas. The lift velocity typically does not exceed 10 m/s (30 ft/s) in an FCC unit.

The riser 20 may operate with catalyst to oil ratio of between about 4 and about 12, preferably between about 4 and about 10. Steam to the riser 20 may be between about 3 and about 15 wt-% of hydrocarbon feed, preferably between about 4 and about 12 wt-%. Before contacting the catalyst, the raw oil feed may have a temperature in a range of from about 149° to about 427° C. (300 to 800° F.), preferably between about 204° and about 288° C. (400° and 550° F.).

The riser 20 may operate in a temperature range of between about 427° and 649° C. (800° and 1200° F.), preferably between about 482° and about 593° C. (900° and 1100° F.). The pressure in the riser 20 may be between about 103 and about 241 kPa (gauge) (15 and 35 psig), preferably at about 138 kPa (gauge) (20 psig).

The feed pressure drop across the feed distributor 12 may be between about 69 and about 690 kPa (gauge) (10 and 100 psig), preferably between about 205 and about 415 kPa (gauge) (30 and 60 psig). The steam on hydrocarbon feed from the distributor may be between about 0.5 and about 7 wt-%, and preferably between about 1 and 6 wt-%.

Figure 7:
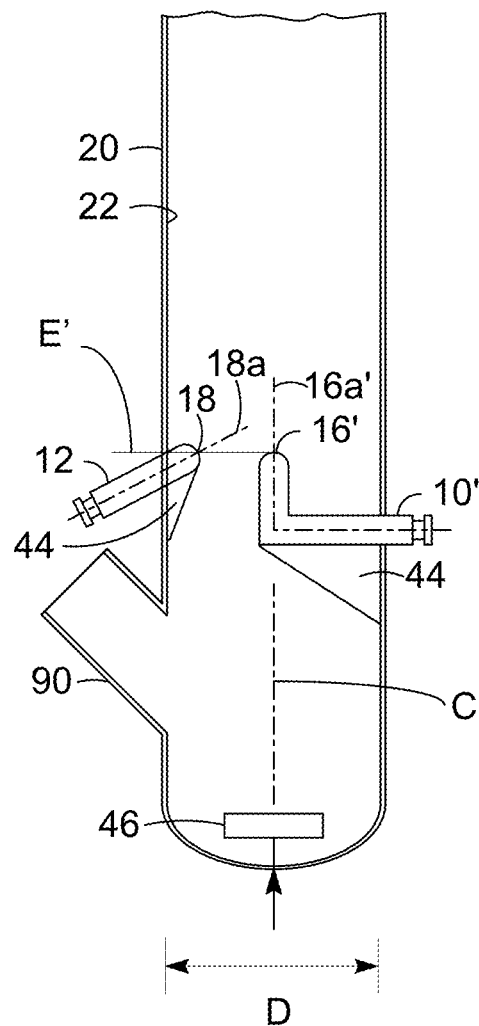
FIG. 7 is an alternative partial sectional view of a riser.

FIG. 7 illustrates an additional embodiment of the invention. Elements in FIG. 7 which correspond to elements in FIGS. 1-6 but with different configurations will be designated with the same reference numeral but appended with the prime symbol ('). In an embodiment, as shown in FIG. 7, a distributor 10' is attached to the wall 22 and horizontally extends into the riser 20 toward the center and then bends to extend vertically upwardly at or near the center. The tip 16' is preferably positioned near the centerline C of the riser and may inject feedstock upwardly into approximately the center of the riser 20. Centerlines 16a' and 18a intersect tips 16' and 18 at the same elevation as indicated by segment E'.

Figure 8:
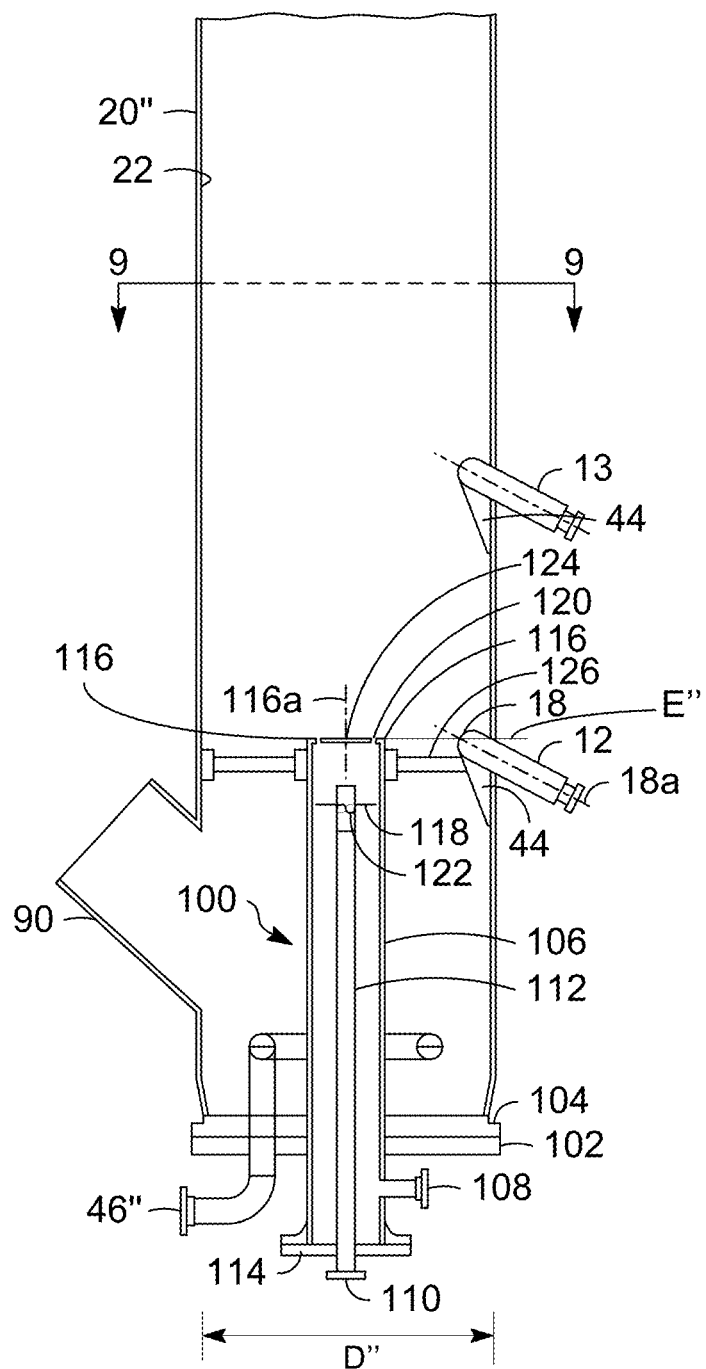
FIG. 8 is a further alternative partial sectional view of a riser.
Figure 9:
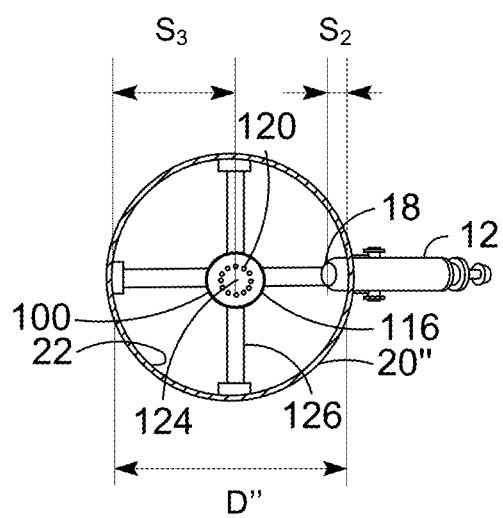
FIG. 9 is a cross-sectional view taken along segment 9-9 in FIG. 8.

FIGS. 8 and 9 illustrate an additional embodiment of the invention. Elements in FIGS. 8 and 9 which correspond to elements in FIGS. 1-6 but with different configurations will be designated with the same reference numeral but appended with the prime symbol ("). FIGS. 8 and 9 depict a centrally located feed distributor 100 in addition to a feed distributor 12 attached to the wall 22. A tip 116 of the center feed distributor 100 has a different radial position than a tip 18 of distributor 12. More than one center distributor 100 may be used. Feed distributor 100 may have a cylindrical configuration. In one embodiment, a tip 18 of distributor 12 and a tip 116 of distributor 100 are at the same elevation. The centerline 18a through tip 18 intersects tip 18 vertically even with the intersection of centerline 116a through tip 116 as shown by segment E". Furthermore, a second distributor 13 attached to the wall 22 may optionally be positioned at a different elevation and radial position than the distributor 12 and/or center distributor 100.

Feed is introduced from the distributor 100 positioned near the center of the riser 20", extending upwardly from the bottom of the riser 20". The distributor 100 is positioned to introduce the feed into approximately the center between the side walls of the riser 20" and at an elevated position above the input of steam from a steam distributor 46" and regenerator standpipe 90. In one embodiment, a distributor flange 102 may attach to the horizontal base 104 of the riser 20" by bolts. A distributor barrel 106 receives dispersion media such as steam from a dispersion media inlet pipe 108. An oil inlet pipe 110 delivers feedstock to an internal oil pipe 112. An oil inlet barrel flange 114 secures the oil inlet pipe 110 to the distributor barrel 106 by bolts. Vanes 122 in the internal oil pipe 112 cause the oil to swirl in the oil pipe before exiting. The internal oil pipe 112 distributes the swirling oil to the distributor barrel 106 where it mixes with dispersion media such as steam, which passes around a pressure disc 118, and the mixture is injected from orifices, or openings, 120 in the distributor tip 116.

As shown in FIG. 9, the openings 120 may be a series of holes, preferably arranged in a circle around a cap 124, on the top of the tip 116. The space $S_3$ for a center distributor 100 between a center of the tip 116 and the closest portion of the wall 22 may be a distance equal to between about 15% and about 50% of the inner diameter D" of the riser 20", preferably between about 35% and about 50%. The space $S_3$ is greater than the space $S_2$ between a center of the tip 18 of distributor 12 and the closest part of the wall 22. A bracket 126 may attach the distributor 100 to the wall 22 for stabilization, preferably attaching to the distributor 100 near its tip 116. It is contemplated that the hole pattern in the tip 116 can take other types of patterns such as concentric circles or other shapes and that a plurality of distributors 100 may be positioned in the riser 20" to ensure adequate proportionation of the feed. The distributors 10, 12 and 100 are available from Bete Fogg Nozzles, Inc.

EXAMPLES

Example 1

A commercially operating FCC unit with a capacity of 31,797,459 liters (200,000 barrels) per day was operating with poorer than expected yields and conversion. Conversion was 2-4 wt-% below the target, and dry gas yields were at 3.4 wt-% which was undesirably higher than the expected benchmark performance. The riser had an inner diameter of 2.2 m (6.6 ft) at the point of feed injection. The feed was injected through a series of feed distributors with equivalent radial penetrations circumferentially located around the periphery of the riser with tips about flush with the inner surface of the wall of the riser.

Figure 10:
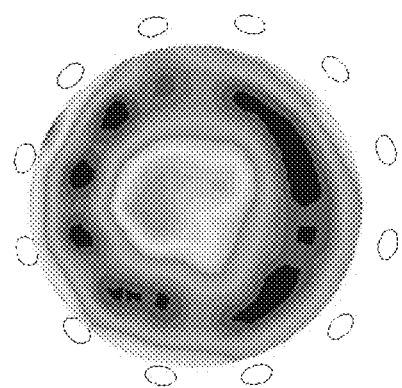
FIG. 10 is a cross-sectional plot of a CFD model of a riser with a conventional distributor arrangement.

A computational fluid dynamics (CFD) model of the riser was created that would predict the catalyst density distribution in the riser downstream of the point of feed injection. The lift velocity was 2.8 m/s (9.2 ft/s) at just below the feed distributors. As shown in the plot in FIG. 10, the model indicated that a vapor annulus would be present at 1.5 m above the feed distributors, indicated by the darker areas, with a high density column of catalyst in the center of the riser indicated by the lighter areas. The lighter areas in the outside of the riser plot also indicate a dense outer annulus.

Figure 11:
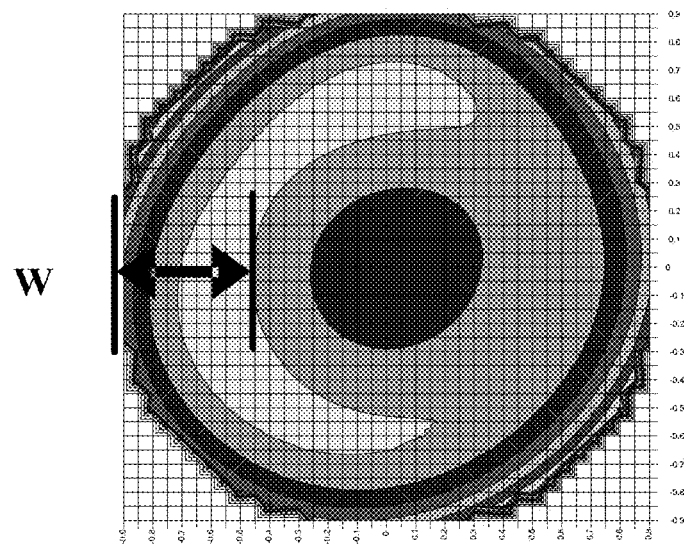
FIG. 11 is a cross-sectional tomograph of a gamma scan of a riser with a conventional distributor arrangement.

An actual gamma scan of the riser was also completed onsite under equivalent conditions. A gamma scan involves injecting radioactive material into various locations, which allowed monitoring of its progression through the riser. Detectors around and throughout the riser monitored catalyst distribution and flow characteristics in the solid phase. FIG. 11 shows a gamma scan tomograph taken of actual operation at 1.5 m above the feed distributors with a lift velocity of 3.0 m/s (9.8 ft/s) below the feed distributors. As shown in the plot in FIG. 11, gamma scan tomography confirmed the generation of a very high density annulus near the riser wall, indicated by the darker areas, an intermediate vapor annulus, indicated by the lighter areas, and a high density catalyst column in the center, indicated by the dark disc, just as predicted by the CFD model. Darker and lighter areas indicate different relative densities in the CFD model and the gamma scan tomograph. A similar generation of annuli and a high density catalyst column was generated at a lift velocity of 4.6 m/s (15 ft/s). The gamma scan tomography also indicated that the boundary of the high density column formed at a distance W of about 0.6 m (2 ft) from the wall. Consequently, for a distributor with openings in a tip positioned at about flush with the inner surface of the wall of the riser, maximum penetration of injected feed and dispersing medium will be limited 0.6 m. Therefore, we discovered that feed penetration problems would exist for any riser over 1.2 m (4 ft) in inner diameter. We estimate the lack of penetration into the dense column would still occur even if all of the distributors had tips protruding into the riser by 0.3 m (1 ft) from the wall equal to 0.15 inner diameters of the riser.

Figure 12:
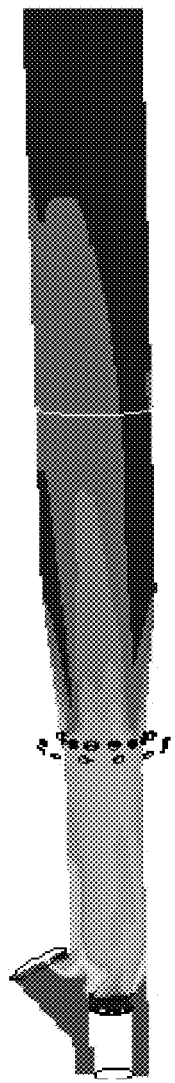
FIG. 12 is a sectioned elevational plot of a CFD model of a riser with a conventional distributor arrangement showing a column of dense catalyst.
Figure 13:
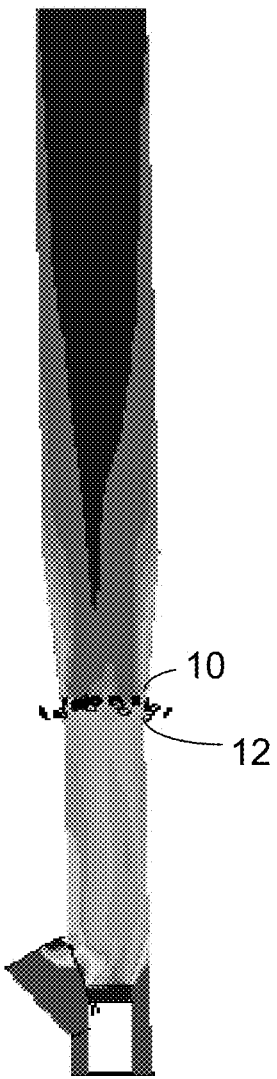
FIG. 13 is a sectioned elevational plot of a CFD model of a riser with the distributor arrangement of the present invention.

Another CFD model plot was generated using the dual radius feed distributors arrangement of the present invention as shown in FIG. 3 except twelve distributors were used having six distributors with tips positioned at 0.5 m (18 inches) from the wall of the riser and the other six distributors with tips positioned about flush with the wall. In FIGS. 12 and 13, the plots of the CFD model are compared. Lift gas velocities of 2.8 m/s (9.2 ft/s) below the feed distributors were used in both models. The conventional distributor arrangement is shown in FIG. 12 with the dense column indicated by the lighter region generated above the catalyst distributors. The CFD plot of the arrangement of distributors 10, 12 of the present invention shown in FIG. 13 confirms the dense column of catalyst was effectively eliminated by the use of dual radius feed distributors.

Figure 14:
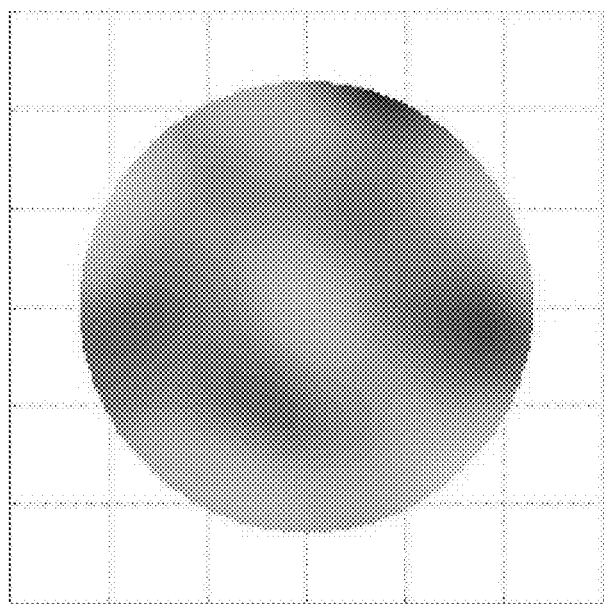
FIG. 14 is a cross-sectional tomograph of a gamma scan of a riser with a distributor arrangement of the present invention.

The dual radius feed distributor arrangement was installed in a FCC unit with a 2.4 m (8 ft) inner diameter riser and operated with a capacity of 31,797,459 liters (200,000 barrels) per day. A gamma scan tomograph of the riser at approximately one riser inner diameter above the point of feed injection and a lift gas velocity of 4.6 m/s (15 ft/s) just below the feed distributors in FIG. 14 indicated that the high density core of catalyst was effectively eliminated. The catalyst density profile of the riser indicates that a very evenly distributed catalyst density profile had been achieved. Only slight density differences were indicated between the center and outer region in FIG. 14. The high density core was also eliminated under the same conditions but at a lift gas velocity of 3 m/s (10 ft/s). Preliminary results indicate a dry gas yield of 2.9 wt %, a 15% improvement in performance. Additionally, conversion was at an acceptable level for the improved unit.

Example 2

Figure 15:
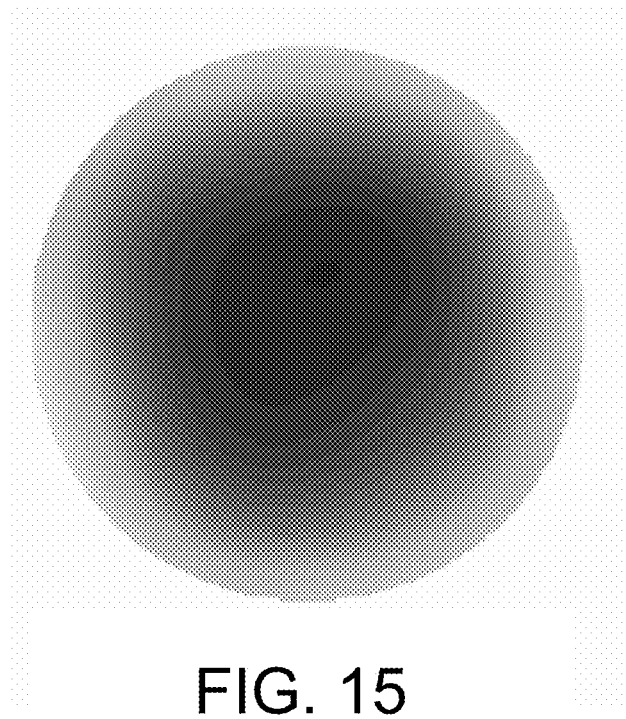
FIG. 15 is a cross-sectional tomograph of a gamma scan of a smaller riser with a distributor arrangement of the present invention.
Figure 16:
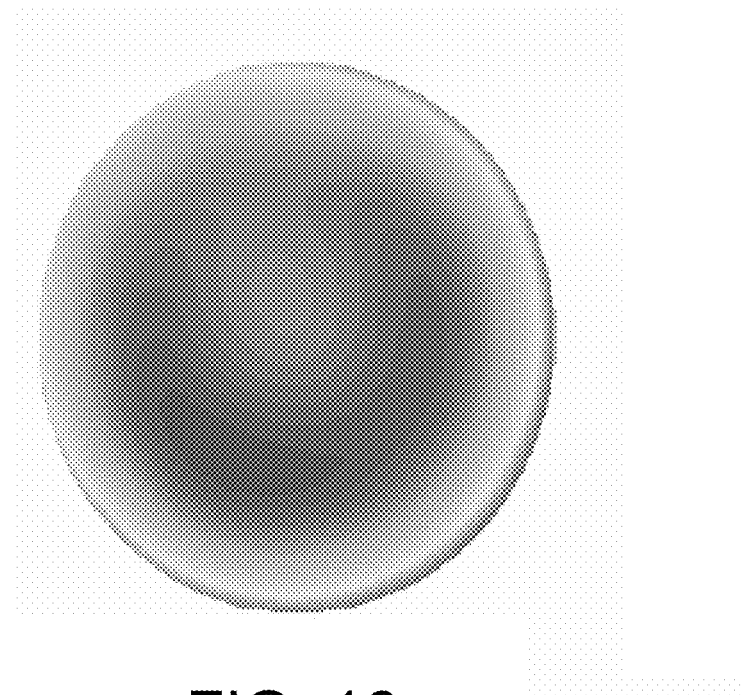
FIG. 16 is a cross-sectional tomograph of a gamma scan of a smaller riser with a conventional distributor arrangement.

Gamma scans were completed on another riser with a conventional feed distribution arrangement on a different unit with an inner diameter of 1.6 m (5 ft) at the point of feed injection that was slightly smaller than the unit tested in Example 1. The first scan was completed with a lift velocity of 4.7 m/s (14 ft/s) in the lower riser section just below the feed distributors. No dense column of catalyst formed, but rather a very uniform catalyst density distributed across the riser at 2.5 m (8.1 ft) above the feed distributors as shown in FIG. 15. However, the second scan that was completed at a lower lift velocity of 3.3 m/s (10 ft/s) did indicate a vapor annulus and a high density column of catalyst had formed, indicated by the lighter region toward the center in FIG. 16. FIG. 16 was taken at 1.5 m (4.8 ft) above the feed distributors. It was not believed that the scan at 4.7 m/s need be taken at a lower elevation to match the elevation of the scan at 3.3 m/s because if an annulus had formed, it would not have dissipated at between 1.5 and 2.5 m elevation in the riser.

Additional radioactive tracer work confirmed the maldistribution in the 1.6 m inner diameter riser at the lift velocity of 3.3 m/s. Radioactive gas was injected into the base of the riser and traced via detectors positioned along the riser. The results indicated that not only was the strength of the radioactive material at the different detectors non-uniform at the lower lift velocity and uniform strengths at the higher lift velocity, but the time of flight of the gas from one detector to another was significantly different at different points around the riser, both indicating maldistribution within the riser at the lower lift velocity. This tomography work indicated that risers with inner diameters moderately greater than 1.3 m can benefit from the distributor arrangement of the present invention at lower lift velocities.

Preferred embodiments of this invention are described herein, including the best mode known to the inventors for carrying out the invention. It should be understood that the illustrated embodiments are exemplary only, and should not be taken as limiting the scope of the invention.

The invention claimed is:

1. A fluid catalytic cracking process comprising:
 passing catalyst and inert gas upwardly in a riser having a wall and an inner diameter defined by said wall of at least 1.3 meters;
 injecting a hydrocarbon feedstock into said riser from at least two distributors penetrating said wall of said riser and having respective tips with at least one opening in each of said tips, said respective tips of said at least two distributors positioned at the same elevation within a margin of 0.1 inner diameters of said riser at the elevation of the feed distributors but positioned at different radial distances from said wall in said riser, said at least two distributors including an inner distributor and an outer distributor and of the total hydrocarbon feedstock injected from the inner distributor and the outer distributor, at least 8 and less than 50 wt-% is injected from the inner distributor;
 cracking said hydrocarbon feedstock in the presence of said catalyst to produce a cracked stream; and
 separating said catalyst from said cracked stream.

2. The process of claim 1 wherein said catalyst and inert gas pass upwardly at a rate of less than 4.7 meters per second.

3. The process of claim 2 wherein said catalyst and inert gas pass upwardly at a rate of less than 4 meters per second.

4. The process of claim 3 wherein said catalyst and inert gas pass upwardly at a rate of less than 3.3 meters per second.

5. The process of claim 1 wherein said inner diameter of said riser is less than or equal to 1.7 meters.

6. The process of claim 5 wherein said catalyst and inert gas pass upwardly at a rate of less than 4.7 meters per second.

7. The process of claim 6 wherein said catalyst and inert gas pass upwardly at a rate of less than 4 meters per second.

8. The process of claim 7 wherein said catalyst and inert gas pass upwardly at a rate of less than 3.3 meters per second.

9. A fluid catalytic cracking process comprising: passing catalyst and inert gas upwardly at a rate of less than 4.7 meters (4 feet) per second in a riser having a wall and an inner diameter defined by said wall of between 1.3 and 2.2 meters;
injecting a hydrocarbon feedstock into said riser from at least two distributors penetrating said wall of said riser and having tips and at least one opening in each of said tips, said tips positioned at the same elevation within a margin of 0.1 inner diameters of said riser at the elevation of the feed distributors but positioned at different radial distances from said wall in said riser, said at least two distributors including an inner distributor and an outer distributor and of the total hydrocarbon feedstock injected from the inner distributor and the outer distributor, at least 8 and less than 50 wt-% is injected from the inner distributor;
cracking said hydrocarbon feedstock in the presence of said catalyst to produce a cracked stream; and
separating said catalyst from said cracked stream.

10. The process of claim 9 wherein said catalyst and inert gas pass upwardly at a rate of no more than 3.3 meters per second.

11. The process of claim 10 wherein said riser has an inner diameter of less than or equal to 1.6 meters.

12. The process of claim 1, wherein at least 8 and less than or equal to 20 wt-% of the total hydrocarbon feedstock is injected from the inner distributor.

13. The process of claim 9, wherein at least 8 and less than or equal to 20 wt-% of the total hydrocarbon feedstock is injected from the inner distributor.

14. The process of claim 1, wherein:
said at least two distributors include a plurality of said inner distributors and a plurality of said outer distributors,
all of said distributors are positioned at the same elevation within a margin of 0.1 inner diameters of said riser, and
wherein half of said distributors comprise said inner distributors and half of said distributors comprise said outer distributors.

15. The process of claim 9, wherein:
said at least two distributors include a plurality of said inner distributors and a plurality of said outer distributors,
all of said distributors are positioned at the same elevation within a margin of 0.1 inner diameters of said riser, and
wherein half of said distributors comprise said inner distributors and half of said distributors comprise said outer distributors.

16. A fluid catalytic cracking process comprising:
passing catalyst and inert gas upwardly in a riser having a wall and an inner diameter defined by said wall of at least 1.3 meters;
injecting a hydrocarbon feedstock into said riser from at least two distributors having respective tips with at least one opening in each of said tips, said respective tips of said at least two distributors positioned at the same elevation within a margin of 0.25 inner diameters of said riser at the elevation of the feed distributors but positioned at different radial distances from said wall in said riser, said at least two distributors including an inner distributor and an outer distributor and of the total hydrocarbon feedstock injected from the inner distributor and the outer distributor, at least 8 and less than 50 wt-% is injected from the inner distributor;
cracking said hydrocarbon feedstock in the presence of said catalyst to produce a cracked stream; and
separating said catalyst from said cracked stream,
wherein said inner distributor and said outer distributor are arranged such that:
said tip of said inner distributor is separated from said wall of said riser by a distance $S_1$, wherein $S_1$ is equal to between about 5% and about 45% of said inner diameter of said riser;
said tip of said outer diameter is separated from said wall of said riser by a distance $S_2$; and
the difference between said distance $S_1$ and said distance $S_2$ is equal to between about 15% and 40% of said inner diameter of said riser.

17. The process of claim 1, wherein said inner distributor and said outer distributor are arranged such that:
said tip of said inner distributor is separated from said wall of said riser by a distance $S_1$, wherein $S_1$ is equal to between about 5% and about 45% of said inner diameter of said riser;
said tip of said outer diameter is separated from said wall of said riser by a distance $S_2$; and
the difference between said distance $S_1$ and said distance $S_2$ is equal to between about 15% and 40% of said inner diameter of said riser.

18. The process of claim 9, wherein said inner distributor and said outer distributor are arranged such that:
said tip of said inner distributor is separated from said wall of said riser by a distance $S_1$, wherein $S_1$ is equal to between about 5% and about 45% of said inner diameter of said riser;
said tip of said outer diameter is separated from said wall of said riser by a distance $S_2$; and
the difference between said distance $S_1$ and said distance $S_2$ is equal to between about 15% and 40% of said inner diameter of said riser.

* * * * *